(12) United States Patent
Correll et al.

(10) Patent No.: US 6,562,739 B1
(45) Date of Patent: May 13, 2003

(54) COATED CLOTH WITH PRINTED PATTERN

(75) Inventors: Roderick W. Correll, Johnstown, NY (US); Charles J. DiNatale, Gloversville, NY (US); Richard B. Arnold, Marion, MA (US); Paul M. Lubin, Westwood, MA (US)

(73) Assignee: Camo-Tek, LLC, Gloversville, NY (US)

( * ) Notice: Subject to any disclaimer, the term of this patent is extended or adjusted under 35 U.S.C. 154(b) by 264 days.

(21) Appl. No.: 09/638,611

(22) Filed: Aug. 15, 2000

(51) Int. Cl.[7] .................. B32B 27/12; B32B 27/04
(52) U.S. Cl. ............... 442/148; 442/123; 442/149; 442/304; 442/311; 428/141; 428/142; 428/195; 428/196; 428/197; 428/919; 2/900
(58) Field of Search .................. 442/123, 148, 442/149, 304, 311; 428/141, 142, 195, 196, 197, 919; 2/900

(56) References Cited

U.S. PATENT DOCUMENTS

| | | |
|---|---|---|
| 3,232,692 A | 2/1966 | Wilbelm et al. |
| 4,214,321 A | 7/1980 | Nuwayser |
| 4,371,988 A | 2/1983 | Berend |
| 4,409,275 A | 10/1983 | Samowich |
| 4,442,162 A | 4/1984 | Kuester |
| 4,454,191 A | 6/1984 | von Blucher et al. |
| 4,536,890 A | 8/1985 | Barnett et al. |
| 4,619,854 A | 10/1986 | Penttinen |
| 4,656,065 A | 4/1987 | Yacovella |
| 4,869,952 A | 9/1989 | Levy |
| 5,024,594 A | 6/1991 | Athayde et al. |
| 5,044,496 A | 9/1991 | Tanaka et al. |
| 5,057,172 A | 10/1991 | Woiceshyn |
| 5,073,425 A | 12/1991 | Dees, Jr. et al. |
| 5,126,182 A | 6/1992 | Lumb et al. |
| 5,391,685 A | 2/1995 | Hitomi et al. |
| 5,543,195 A | 8/1996 | Squires et al. |
| 5,645,889 A * | 7/1997 | Potosky et al. .............. 427/256 |
| 5,681,408 A * | 10/1997 | Pate et al. .................. 156/71 |
| 5,756,180 A | 5/1998 | Squires et al. |
| 5,830,937 A * | 11/1998 | Shalov et al. ............... 524/297 |
| 5,854,306 A | 12/1998 | Mattesky et al. |
| 5,876,551 A * | 3/1999 | Jackson .................. 156/307.4 |

\* cited by examiner

Primary Examiner—Terrel Morris
Assistant Examiner—Ula C. Ruddock
(74) Attorney, Agent, or Firm—Schmeiser, Olsen & Watts LLP

(57) ABSTRACT

A coated cloth includes a fabric layer having a three-dimensional pattern printed thereon. A clear coating layer is secured to the fabric layer and disposed over at least a portion of the three-dimensional pattern. Also, the cloth may include a clear adhesive layer forming a bond between the coating layer and the fabric layer. The present invention also includes a method of forming a coated cloth. The method includes applying a coating material to a substrate, thereby forming a coating layer on the substrate. The coating layer is allowed to partially cure, and a three-dimensionally patterned fabric layer is applied to the coating layer. The method may also include applying an adhesive material to the coating layer, thereby forming an adhesive layer that bonds the fabric layer to the coating layer.

37 Claims, 2 Drawing Sheets

COATED CLOTH WITH PRINTED PATTERN

BACKGROUND OF THE INVENTION

1. Technical Field

This invention relates to a coated cloth, and more specifically to a cloth having a three-dimensional or camouflage pattern printed thereon.

2. Background Art

Many types of patterns have been printed on fabric. Camouflage patterns are commonly printed on fabric to disguise the fabric, and thus the wearer or contents of the fabric. Different camouflage patterns are used to disguise the fabric for different types of terrain. For example, the camouflage pattern may be made to appear like a tree. Such camouflage may include a pattern that depicts leaves, tree bark, and branches.

Camouflage patterns are typically three-dimensional patterns (meaning that they appear to have depth). The three-dimensional appearance of the patterns is important because a two-dimensional appearance will make the fabric stand out in comparison to a real three-dimensional object such as a tree. It is also important that the particular colors of each pattern, including tones, hues and shading are maintained because different colors stand out in comparison to terrain having particular colors. Also, each camouflage pattern has a particular amount of definition or blending between different colors or shades. Such definition or blending, along with the particular colors and the three-dimensional appearance should be maintained to create a realistic appearance that will blend into the terrain and produce the desired disguise.

DISCLOSURE OF INVENTION

Because of the demands of patterned fabric, and in particular the demands of three-dimensional patterns, coatings such as waterproof coatings have not heretofore been employed that retain the appearance of the patterned fabric while protecting the fabric in the desired manner. Therefore, there existed a need to provide a coating that would provide sufficient protection for patterned fabric without detracting from the appearance of the pattern.

The present invention provides such a coating that does not detract from the appearance of the pattern. Moreover, the coating surprisingly enhances the appearance of the pattern. This is particularly true when the coating is applied to fabric having three-dimensional camouflage patterns—the coating layer enhances the appearance of the printed pattern and adds a three-dimensional clarity to the printed pattern that is not present without the coating layer. Thus the coating enhances the disguising effect of camouflage patterned fabric.

According to the present invention, a coated cloth includes a fabric layer having a three-dimensional pattern printed thereon. A clear coating layer is secured to the fabric layer and disposed over at least a portion of the three-dimensional pattern. Such an abrasion resistance is sufficient so that the appearance of the coating layer will not be damaged during normal use, and particularly during outdoor use.

It is typically desirable for the coating layer to have a dull finish because a shiny finish would alter the appearance of the pattern and would likely thwart the disguising function of the pattern if the pattern is camouflage. The coating layer may include a plasticizer. Also, the cloth may include a clear adhesive layer forming a bond between the coating layer and the fabric layer.

The coated cloth is particularly suited to form at least a portion of an outer layer of an object such as a bag or a glove to be used in an outdoor setting. However, the coated cloth may also be used for other objects. Typically, different characteristics are desirable depending on the object. Also, the pattern may include multiple colors that form a three-dimensional pattern.

The present invention also includes a method of forming a coated cloth. The method includes applying a coating material to a substrate, thereby forming a coating layer on the substrate. The coating layer is allowed to partially cure, and a three-dimensionally patterned fabric layer is applied to the coating layer. The coating layer is allowed to fully cure so that the coating layer is clear. The method may also include applying an adhesive material to the coating layer, thereby forming an adhesive layer that bonds the fabric layer to the coating layer. The adhesive layer will typically allow the coating layer to be cured at lower temperatures without reducing the clarity of the coating layer. Also, multiple colors may be printed on the fabric layer by screen printing.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements.

MODES FOR CARRYING OUT THE INVENTION

Figure 1:
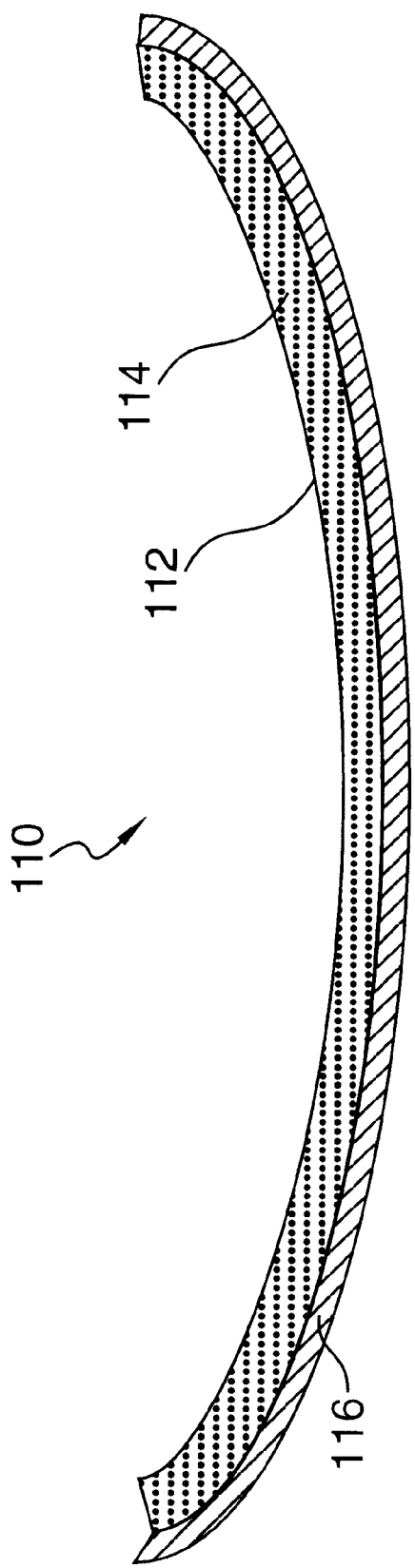
FIG. 1 is a broken away sectional view of an embodiment of the present invention.

Referring to FIG. 1, in an embodiment of the present invention, a portion of a glove 110 includes an outer layer that is a coated cloth 112. It should be noted that all of cloth 112 may be coated or only a portion of cloth 112 may be coated. Coated cloth 112 includes a fabric layer 114 and a coating layer 116 secured to fabric layer 114 and disposed over at least a portion of fabric layer 114. Fabric layer 114 is preferably secured to coating layer 116 by coating layer 116 penetrating the surface of fabric layer 114. Coating layer 116 is preferably clear, abrasion-resistant, and tacky or grippy. Fabric layer 114 preferably has a pattern printed thereon, which is preferably a three-dimensional camouflage pattern.

Coating layer 116 provides abrasion protection for fabric layer 114. Coating layer 116 also provides a tacky or grippy surface that enhances the wearer's grip when such a wearer uses the gloves to grip objects. Coating layer 116 also enhances the appearance of the printed pattern and surprisingly adds a three-dimensional clarity to the printed pattern that is not present without coating layer 116. It is believed that this added clarity is due to the surface texture of coating layer 116 and to the slight diffraction of light as it passes through coating layer 116, which is similar to the effect of placing a glass covering over a three-dimensional painting or photograph. Thus, the vibrance of color and sharpness of the resolution of the printed pattern is not only maintained, it is enhanced.

Referring still to FIG. 1, and describing coated cloth 112 in more detail, fabric layer 114 preferably includes a network of fibers. Preferably, fabric layer 114 has some stretch, is easily dyed, and is sufficiently strong in both tensile and tear strength. However, it should be noted that in applications other than gloves, different characteristics may be desirable for the fabric layer. In a preferred embodiment, fabric layer 114 is a 50/50 polyester/cotton blend with a weight of about 4 ounces per square yard and a yield of about 2 yards per pound. It is preferred that the weight be 4.1 ounces per square yard and that the yield be 2.34 yards per pound.

Fabric layer 114 preferably includes a printed pattern thereon that is preferably formed by ink that has penetrated and dyed the fibers in fabric layer 114. The ink that dyes the fibers and forms the pattern is preferably a type of ink that will not react with (i.e., migrate into) the type of plasticizer used. The printed pattern is preferably a three-dimensional camouflage pattern that includes multiple colors. For example, such a pattern may include up to eleven colors, or even more. The pattern is preferably formed to disguise the wearer of glove 110 in a particular type of terrain.

Coating layer 116 is preferably clear, abrasion-resistant, and tacky or grippy. Coating layer 116 should be clear enough so that it does not distort the pattern formed in fabric layer 114. Preferably, coating layer 116 is also clear enough so that the colors and resolution of the underlying pattern are not altered. Coating layer 116 should be sufficiently abrasion resistant to withstand rubbing that occurs while using glove 110, and particularly while using glove 110 in outdoor settings. Preferably, coating layer 116 has an abrasion resistance of at least about 900 cycles before passing through the coating and coated cloth 112 has an abrasion resistance of at least about 1000 cycles before passing through the fabric for a 5306 Taber test with a H18 grip wheel and a load of 500 grams. In a preferred embodiment, coating layer 116 has an abrasion resistance of at least about 2000 cycles before passing through the coating and fabric layer 114 has an abrasion resistance of at least about 2200 cycles before passing through the fabric for a 5306 Taber test with a H18 grip wheel and a load of 500 grams. Coating layer 116 should be sufficiently tacky to allow a user to grip an object, such as a gun or a bow.

Coating layer 116 preferably includes a plasticizer that produces a clear coating. In a preferred embodiment, the coating is a polyvinyl chloride coating with diisononyl phthalate as a plasticizer. The amount of plasticizer is preferably sufficient to produce the values of clarity, abrasion resistance and tackiness discussed above. Preferably coating layer 116 includes the plasticizer in an amount of from about 110 to about 120 parts per hundred of resin (i.e., parts per hundred of coating material). In a preferred embodiment coating layer 116 includes the plasticizer in an amount of about 115 parts per hundred of resin.

Coated cloth 112 preferably has a tensile strength in the warp or machine direction of at least about 37 pounds for an ASTM D-751-B test. Generally, coated cloth 112 has a tensile strength in the warp or machine direction of from about 37 to about 42 pounds for an ASTM D-751-B test. Coated cloth 112 preferably has a tensile strength in the fill or transverse direction of at least about 23 pounds for an ASTM D-751-B test. Generally, coated cloth 112 has a tensile strength in the fill or transverse direction of from about 23 to about 26 pounds for an ASTM D-751-B test.

Coated cloth 112 preferably has a tear strength in the warp or machine direction of at least about 4.2 pounds for an ASTM D-751-B test. Generally, coated cloth 112 has a tear strength in the warp or machine direction of from about 4.2 to about 8.7 pounds for an ASTM D-751-B test. Coated cloth 112 preferably has a tear strength in the fill or transverse direction of at least about 3.0 pounds for an ASTM D-751-B test. Generally, coated cloth 112 has a tear strength in the warp or machine direction of from about 3.0 to about 7.3 pounds for an ASTM D-751-B test.

In making coated cloth 112, preferably fabric layer 114 is formed by standard fabric knitting methods that are well known to those skilled in the art. Preferably fabric layer 114 is pure finished (i.e., it is finished without treatments such as stain-resistance treatments) with heat set to a minimum of 380 degrees Fahrenheit so that coating layer 116 will bond to fabric layer 114 as described below. This heat set should prevent shrinkage in the machine direction (direction in which the fabric is being fed through the machine during coating, usually the elongate direction) or transverse direction (perpendicular to the machine direction) because significant shrinkage in either direction would adversely affect the coating process described below and the quality of the resulting coated cloth 112. Preferably, fabric layer 114 is such that shrinkage does not exceed 5 percent in either the machine direction or the transverse direction during the coating process described below.

Fabric layer 114 is preferably printed with a three dimensional camouflage pattern. This is preferably done by screen printing each of the colors for the pattern, which is a standard practice in printing camouflage patterns on fabric. Depending on the particular pattern, seven or more colors may be applied in separate screen print applications. The ink from the screen print process preferably dyes the fibers in fabric layer 114 to produce the desired pattern. Preferably, the ink is an ink that will not react with (i.e., migrate into) coating layer 116 and that will remain stable at the temperatures described below for curing coating layer 116 and will not bleed after the coating process.

Preferably, the fabric is formed as rolls of fabric with gummed selvage extending along the fabric on opposing edges. The gummed selvage allows the edges of the fabric to lay flat on the conveyor or table while the coating layer is applied as described below. This prevents the edges of the fabric from curling in as the fabric is coated. However, the edges of the fabric may be secured to the conveyor or table in some other manner to prevent the edges from curling in during coating. Preferably, the fabric rolls include fabric that is at least 60 inches wide and that has a minimal number of seams or defects that could disrupt a continuous feed coating process.

Preferably, coating is performed as a continuous feed process where the fabric is fed from a feed roll, through the coating process, and onto a take-up roll. In the coating process, the coating material is preferably cast onto a substrate, which is preferably a continuous sheet of smooth paper, to form coating layer 116 on the substrate. The paper is preferably a dull finished paper so as to produce a dull finish on layer 116. The finish on layer 116 is preferably dull enough to prevent excessive glare that would thwart the disguise of a resulting camouflage object. However, it should not be so dull that it hinders the clarity of coating layer 116. Coating layer 116 is partially cured in an environment that is preferably at a temperature of at least about 350 degrees Fahrenheit. It has been found that temperatures of from about 350 degrees Fahrenheit to about 400 degrees Fahrenheit work particularly well. Higher temperatures may also be used if fabric layer 114 can withstand such temperatures. Fabric layer 114 is then preferably dropped onto coating layer 116.

The resulting coated cloth 112 is placed in an environment that is preferably at a temperature of at least about 350 degrees Fahrenheit. It has been found that temperatures of from about 350 degrees Fahrenheit to about 400 degrees Fahrenheit work particularly well. Higher temperatures may also be used if fabric layer 114 can withstand such temperatures. Coated cloth 112 is kept in this environment until coating layer 116 has fully cured and has bonded to fabric layer 114. It is important that coating layer 116 be fully cured at a sufficiently high temperature and for a sufficiently long time so that it fully bonds to fabric layer 114 because the finish will not be sufficiently clear if the layers are not fully bonded. Coated cloth 112 is then preferably allowed to cool and rolled onto the take-up roll.

Coated cloth 112 is then heated in an environment that is at a temperature of about 250 degrees Fahrenheit and is roller embossed to impress a texture on the surface of the coating. Coated cloth 112 is then rolled up again. The embossing rollers are preferably dull finished to produce a dull finish on coating layer 116. The resulting coated cloth 112 may be used for producing gloves 110 or other fabric products according to standard manufacturing and assembly methods.

The resulting gloves 110 have an external coated cloth 112, wherein the coating layer 116 is clear so that it does not alter the appearance of the underlying pattern of fabric layer 114. Coating 116 is also tacky and abrasion-resistant so that it will be useful to a user and able to withstand continued use in adverse weather and other outdoor conditions.

Figure 2:
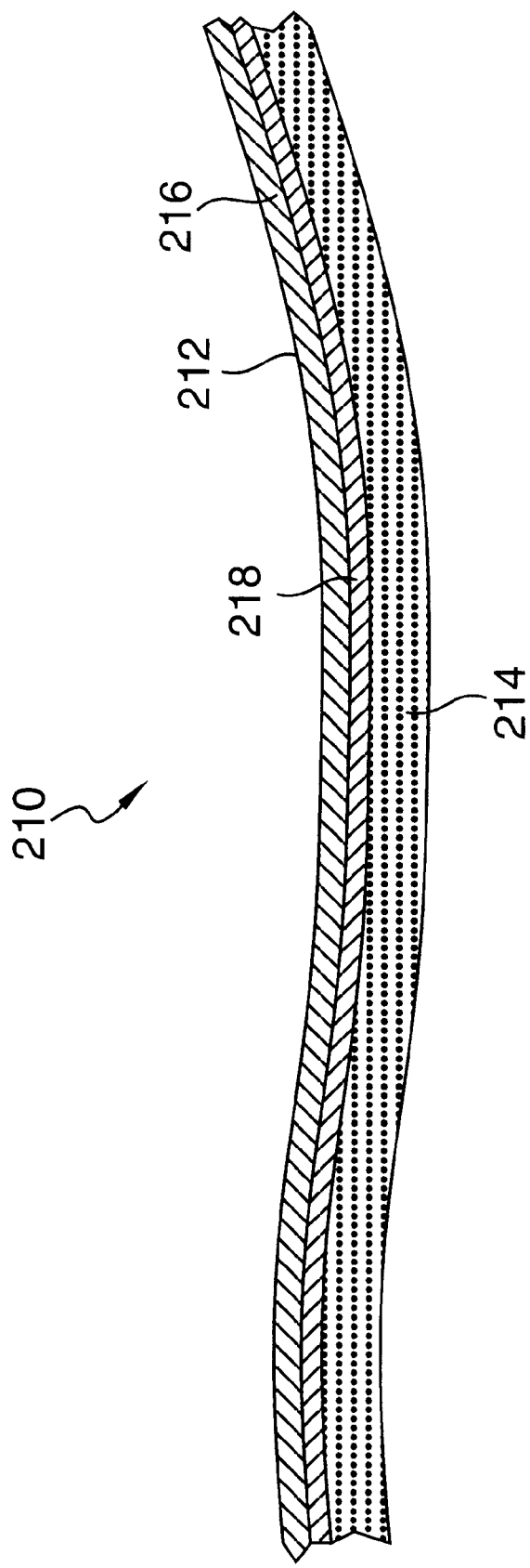
FIG. 2 is a broken away sectional view an embodiment of the present invention.

Referring now to FIG. 2, in another embodiment of the present invention, a portion of a bag 210 includes an outer layer that is a coated cloth 212. It should be noted that all of cloth 212 may be coated or only a portion of cloth 212 may be coated. Coated cloth 212 includes a fabric layer 214 and a coating layer 216 secured to fabric layer 214 by an adhesive layer 218. Adhesive layer 218 and coating layer 216 are disposed over at least a portion of fabric layer 214. Coating layer 216 is preferably clear, abrasion-resistant, puncture-resistant, and waterproof. Fabric layer 214 preferably has a pattern printed thereon, which is preferably a three-dimensional camouflage pattern.

Coating layer 216 provides abrasion and waterproof protection for fabric layer 214. Coating layer 216 also enhances the puncture resistance of coated cloth 212. Coating layer 216 also enhances the appearance of the printed pattern and surprisingly adds a three-dimensional clarity to the printed pattern that is not present without coating layer 216. It is believed that this added clarity is due to the surface texture of coating layer 216 and to the slight diffraction of light as it passes through coating layer 216, which is similar to the effect of placing a glass covering over a three-dimensional painting or photograph. Thus, as with the previous embodiment, the vibrance of color and sharpness of the resolution of the printed pattern is not only maintained, it is enhanced.

Referring still to FIG. 2, and describing coated cloth 212 in more detail, fabric layer 214 preferably includes a network of fibers. Preferably, fabric layer 214 is dimensionally stable, is easily dyed, is puncture-resistant, and is sufficiently strong in both tensile and tear strength. However, it should be noted that in applications other than bags, different characteristics may be desirable for the fabric layer. In a preferred embodiment, fabric layer 214 is a spun polyester woven fabric with a weight of about 7 ounces per square yard.

Fabric layer 214 preferably includes a printed pattern thereon that is preferably formed by ink that has penetrated and dyed the fibers in fabric layer 214. The ink that dyes the fibers and forms the pattern is preferably a type of ink that will not react with (i.e., migrate into) the type of plasticizers used. The printed pattern is preferably a three-dimensional camouflage pattern that includes multiple colors. For example, such a pattern may include up to eleven colors, or even more. The pattern is preferably formed to disguise bag 210 and its contents in a particular type of terrain.

Coating layer 216 is preferably clear, abrasion-resistant, puncture-resistant and waterproof. Coating layer 216 is preferably about 0.005 inch thick, although the thickness may vary depending on the specific application for coated cloth 212. Coating layer 216 and adhesive layer 218 should be clear enough so that they do not distort the pattern formed in fabric layer 214. Preferably, coating layer 216 and adhesive layer 218 are clear enough so that the colors and resolution of the underlying pattern are not altered. Coating layer 216 should be sufficiently abrasion-resistant to withstand rubbing that occurs while using bag 210, and particularly while using bag 210 in outdoor settings. Preferably, coating layer 216 has an abrasion resistance of at least about 30,000 cycles before passing through the coating, and overall coated cloth 212 has an abrasion resistance of at least about 36,000 cycles before passing through coated cloth 212 for a 5306 Taber test with a H18 grip wheel and a load of 500 grams. Coating layer 216 should also be somewhat puncture-resistant to enhance the overall puncture resistance of coated cloth 212.

Coating layer 216 preferably includes a plasticizer that produces a clear coating. In a preferred embodiment, coating layer 216 is a polyvinyl chloride coating with diisononyl phthalate as a plasticizer. The amount of plasticizer is preferably sufficient to produce the clarity, abrasion resistance and puncture resistance discussed above. Preferably, coating layer 216 includes the plasticizer in an amount of from about 58 to about 66 parts per hundred of resin. In a preferred embodiment coating layer 216 includes the plasticizer in an amount of about 62 parts per hundred of resin.

Adhesive layer 218 preferably includes an adhesive material that is clear, that will fuse at low temperatures, and that will sufficiently bond coating layer 216 to fabric layer 214. Preferably, the adhesive material will bond at temperatures as low as about 275 degrees Fahrenheit. For example, the adhesive may be a copolymer resin that bonds at such low temperatures. Also, the adhesive material preferably has a viscosity in a wet state such that the adhesive has some "hold" to it. This allows the adhesive to cling to fabric layer 214 and the coating layer 216 during the coating process described below. Preferably, adhesive layer 218 produces a bond of from about 5 pounds for a 1 inch strip to about 8 pounds for a 1 inch strip. In a preferred embodiment, adhesive layer 218 produces a bond of about 5 pounds for a one inch strip. Also, in some testing higher bond strengths have proven to be satisfactory for the present invention. For example, for an ASTM D-751 test, bond strengths of from about 8 to about 13 pounds for a one inch strip have been measured on satisfactory coated cloths.

Coated cloth 212 preferably has a tensile strength in the warp or machine direction of at least about 276 pounds for an ASTM D-751-B test. Coated cloth 212 preferably has a tensile strength in the fill or transverse direction of at least about 127 pounds for an ASTM D-751-B test. Coated cloth 212 preferably has a tear strength in the warp or machine direction of at least about 20 pounds for an ASTM D-751-B test. Coated cloth 212 preferably has a tear strength in the fill or transverse direction of at least about 29 pounds for an ASTM D-751-B test.

Coated cloth 212 preferably has a puncture resistance of at least about 65 pounds for a 5120 Federal Standard 191A Modified (screwdriver tip method) test, and more preferably has a puncture resistance of at least about 79 pounds for the 5120 Federal Standard 191A Modified (screwdriver tip method) test.

Also, it is preferred that coating layer 216 is waterproof and that adhesive layer 218 is waterproof. Preferably, under 600 millimeters of water for 30 minutes, coating layer 216 and adhesive layer 218 allow less than about 1.0 gram of water through coating layer 216 and adhesive layer 218. More preferably, coating layer 216 and adhesive layer 218 allow less than about 0.5 grams of water through coating layer 216 during this test. Thus, adhesive layer 218 is advantageous in that it the combination of coating layer 216 and adhesive layer 218 form a dual barrier to water.

In making coated cloth 212, preferably fabric layer 214 is formed by standard fabric weaving methods that are well known to those skilled in the art. Preferably, fabric layer 214 is pure finished (i.e., it is finished without treatments such as stain-resistance treatments) with heat set to a minimum of 380 degrees Fahrenheit so that coating layer 216 will bond to fabric layer 214 as described below. Preferably, this heat set will prevent shrinkage in the machine direction (direction in which the fabric is being fed through the machine during coating, usually the elongate direction) or transverse direction (perpendicular to the machine direction) because significant shrinkage in either direction would adversely affect the coating process described below and the quality of the resulting coated cloth 212. Preferably, fabric layer 214 is such that shrinkage does not exceed 2 percent in either the machine direction or the transverse direction during the coating process described below.

Fabric layer 214 is preferably printed with a three dimensional camouflage pattern. This is preferably done by screen printing each of the colors for the pattern, which is a standard practice in printing camouflage patterns on fabric. Depending on the particular pattern, eleven or more colors may be applied in separate screen print applications. The ink from the screen print process preferably dyes the fibers in fabric layer 214 to produce the desired pattern. Preferably, the ink is an ink that will not react with (i.e., migrate into) coating layer 216 and that will remain stable at the temperatures described below for curing coating layer 216 and will not bleed after the coating process.

Preferably, the fabric is formed as rolls of fabric with sewn selvage extending along the fabric on opposing edges. The sewn selvage allows the edges of the fabric to lay flat on the conveyor or table while the coating layer is applied as described below. This prevents the edges of the fabric from curling in as the fabric is coated. Preferably, the fabric rolls include fabric that is at least 60 inches wide and that has a minimal number of seams or defects that could disrupt a continuous feed coating process.

Preferably, coating is performed as a continuous feed process where the fabric is fed from a feed roll, through the coating process, and onto a take-up roll. In the coating process, the coating material is preferably cast onto a substrate, which is preferably a continuous sheet of smooth paper, to form coating layer 216 on the substrate. The coating material is preferably de-aerated prior to being cast onto the substrate to prevent the formation of pin holes in coating layer 116 that would allow water to pass through coating layer 116, and to prevent internal gases from clouding the resulting coating layer 216. The paper is preferably a dull finished paper so as to produce a dull finish on layer 216. The finish on layer 216 is preferably dull enough to prevent excessive glare that would thwart the disguise of a resulting camouflage object. However, it should not be so dull that it hinders the clarity of coating layer 216. Coating layer 216 is partially cured in an environment that is preferably at a temperature of at least about 255 degrees Fahrenheit. It has been found that temperatures of from about 255 degrees Fahrenheit to about 350 degrees Fahrenheit work particularly well. Higher temperatures may also be used if fabric layer 214 can withstand such temperatures. In a preferred embodiment, coating layer 216 is partially cured in an environment that is at a temperature of about 330 degrees Fahrenheit. The adhesive material is preferably de-aerated and then cast onto coating layer 216 to form adhesive layer 218. Fabric layer 214 is then preferably dropped onto adhesive layer 218.

The resulting coated cloth 212 is placed in an environment that is preferably at a temperature of at least about 255 degrees Fahrenheit. It has been found that temperatures of from about 255 degrees Fahrenheit to about 350 degrees Fahrenheit work particularly well. Higher temperatures may also be used if fabric layer 214 can withstand such temperatures. Coated cloth 212 is kept in this environment until coating layer 216 has fully cured and adhesive layer 218 has bonded coating layer 216 to fabric layer 214. It is important that coating layer 216 and adhesive layer 218 be fully cured at a sufficiently high temperature and for a sufficiently long time so that adhesive layer 218 fully bonds to fabric layer 214 and to coating layer 216 because the finish will not be sufficiently clear if the layers are not fully bonded. Coated cloth 212 is then preferably allowed to cool and rolled onto the take-up roll.

Then coated cloth 212 is heated in an environment that is at a temperature of about 250 degrees Fahrenheit and is roller embossed to impress a texture on the surface of the coating. Coated cloth 212 is then rolled up again. The embossing rollers are preferably dull finished to produce a dull finish on coating layer 216. The resulting coated cloth 212 may be used for producing bags 210 or other fabric products according to standard manufacturing and assembly methods.

The addition of adhesive layer 218 allows coating layer 216 to be cured at lower temperatures than are possible without adhesive layer 218. Thus, fabrics may be used even if they are not stable at the higher temperatures needed to coat fabric without adhesive layer 218. For this reason, it may be desirable to use an adhesive layer with other coatings and other fabrics, such as the coating and fabric described above with reference to FIG. 1.

The resulting bags 210 have an external coated cloth 212, wherein the coating layer 216 is clear so that it does not alter the appearance of the underlying pattern of fabric layer 214. Coating 216 is also waterproof, puncture-resistant, and abrasion-resistant so that it will be useful to a user and able to withstand continued use in adverse weather and other outdoor conditions.

While the invention has been particularly shown and described with reference to preferred embodiments thereof, it will be understood by those skilled in the art that various changes in form and details may be made therein without departing from the spirit and scope of the invention.

What is claimed is:

1. A coated cloth comprising:
   a fabric layer comprising a network of fibers, the fabric layer having a three-dimensional pattern printed thereon, wherein the pattern is a camouflage pattern; and a clear coating layer secured to the fabric layer and disposed over at least a portion of the three-dimensional pattern, wherein said coating layer comprises a plasticizer.

2. The cloth of claim 1, wherein the coating layer has an abrasion resistance of at least about 900 cycles before passing through the coating layer for a 5306 Taber test with a H18 grip wheel and a load of 500 grams.

3. The cloth of claim 1, wherein the coating layer has an abrasion resistance of at least about 30,000 cycles before passing through the coating layer for a 5306 Taber test with a H18 grip wheel and a load of 500 grams.

4. The cloth of claim 1, wherein the coating layer has a dull finish, a dull finish being defined as a diffusely reflecting surface.

5. The cloth of claim 1, wherein the plasticizer comprises diisononyl phthalate.

6. The cloth of claim 5, wherein the printed pattern comprises an ink that does not react with diisononyl phthalate.

7. The cloth of claim 1, wherein the coating layer comprises the plasticizer in an amount of from about 58 parts per hundred to about 120 parts per hundred.

8. The cloth of claim 1, wherein the coating layer comprises the plasticizer in an amount of from about 58 parts per hundred to about 66 parts per hundred.

9. The cloth of claim 1, wherein the coating layer comprises the plasticizer in an amount of from about 110 parts per hundred to about 120 parts per hundred.

10. The cloth of claim 1, further comprising a clear adhesive layer forming a bond between the coating layer and the fabric layer.

11. The cloth of claim 10, wherein the bond formed by the adhesive layer is from about 5 pounds for a 1 inch strip to about 8 pounds for a 1 inch strip.

12. The cloth of claim 1, wherein the pattern comprises multiple colors.

13. A coated camouflage cloth comprising:
   a fabric layer comprising a network of fibers, the fabric having a three-dimensional camouflage pattern printed thereon; and
   a clear tacky coating layer comprising a plasticizer, the coating layer secured to the fabric layer and disposed over the camouflage pattern.

14. The cloth of claim 13, wherein the coating layer has a dull finish, a dull finish being defined as a diffusely reflecting surface.

15. The cloth of claim 13, wherein the plasticizer comprises diisononyl phthalate.

16. The cloth of claim 15, wherein the coating layer comprises the plasticizer in an amount of from about 110 parts per hundred to about 120 parts per hundred.

17. The cloth of claim 16, wherein the coating layer comprises the plasticizer in an amount of about 115 parts per hundred.

18. The cloth of claim 17, the coating layer has an abrasion resistance of at least about 900 cycles before passing through the coating layer for a 5306 Taber test with a H18 grip wheel and a load of 500 grams.

19. The cloth of claim 18, wherein the printed pattern comprises an ink that does not react with diisononyl phthalate.

20. The cloth of claim 19, wherein the pattern comprises multiple colors.

21. The cloth of claim 20, wherein the pattern comprises at least seven colors.

22. The cloth of claim 21, wherein the fabric layer has a weight of about 4 ounces per square yard and wherein fibers of the fabric layer comprise a knit blend of polyester and cotton.

23. The cloth of claim 22, wherein the cloth forms at least a portion of an outer layer of a glove.

24. A coated camouflage cloth comprising:
   a fabric layer comprising a network of fibers, the fabric having a three-dimensional camouflage pattern printed thereon; and
   a clear coating layer comprising a plasticizer, the coating layer disposed over the camouflage pattern; and
   an adhesive layer forming a bond between the coating layer and the fabric layer.

25. The cloth of claim 24, wherein the coating layer has a dull finish, a dull finish being defined as a diffusely reflecting surface.

26. The cloth of claim 25, wherein the plasticizer comprises diisononyl phthalate.

27. The cloth of claim 26, wherein the coating layer comprises the plasticizer in an amount of from about 58 parts per hundred to about 66 parts per hundred.

28. The cloth of claim 27, wherein the coating layer comprises the plasticizer in an amount of about 62 parts per hundred.

29. The cloth of claim 28, wherein the coating layer has an abrasion resistance of at least about 30,000 cycles before passing through the coating layer for a 5306 Taber test with a H18 grip wheel and a load of 500 grams.

30. The cloth of claim 29, wherein the coated cloth has a puncture resistance of at least about 65 pounds for a 5120 Federal Standard 191A modified (screwdriver tip method) test.

31. The cloth of claim 30, wherein the coating layer is about 0.005 inch thick.

32. The cloth of claim 31, wherein the printed pattern comprises an ink that does not react with diisononyl phthalate.

33. The cloth of claim 32, wherein the pattern comprises multiple colors.

34. The cloth of claim 33, wherein the pattern comprises at least seven colors.

35. The cloth of claim 34, wherein the fabric layer has a weight of about 7 ounces per square yard and wherein fibers of the fabric layer comprise spun polyester woven fabric.

36. The cloth of claim 35, wherein the cloth forms at least a portion of an outer layer of a glove.

37. The cloth of claim 36, wherein the bond formed by the adhesive layer is about 5 pounds for a 1 inch strip.

* * * * *